US005483271A

United States Patent [19]

Ohno et al.

[11] Patent Number: 5,483,271

[45] **Date of Patent: * Jan. 9, 1996**

[54] ELECTROSTATIC LATENT IMAGE FORMING APPARATUS HAVING A PLURALITY OF PHOTOELECTRIC CONVERTERS

[75] Inventors: Tadayoshi Ohno; Koji Tanimoto; Mamoru Mizuguchi, all of Kawasaki; Shigeru Fujiwara, Yokohama, all of Japan

[73] Assignee: Kabushiki Kaisha Toshiba, Japan

[ * ] Notice: The portion of the term of this patent subsequent to Jan. 4, 2011, has been disclaimed.

[21] Appl. No.: 998,953

[22] Filed: Dec. 31, 1992

[30] Foreign Application Priority Data

Jan. 8, 1992 [JP] Japan .................................... 4-001373

[51] Int. Cl.$^6$ .................................................... G01D 15/14

[52] U.S. Cl. ............................................ 347/129; 347/224

[58] Field of Search ................................ 346/167, 107 R, 346/108, 153.1, 159; 257/53, 443, 448; 347/112, 129, 224

[56] References Cited

U.S. PATENT DOCUMENTS

| | | | |
|---|---|---|---|
| 3,228,029 | 1/1966 | McNaney | 346/160 |
| 3,322,539 | 5/1967 | Redington | 346/160 |
| 4,410,614 | 10/1983 | Lelental et al. | 346/160 |
| 4,448,867 | 5/1984 | Ohkubo et al. | 346/153.1 X |
| 4,620,203 | 10/1986 | Nakatani et al. | 346/153.1 |
| 4,646,163 | 2/1987 | Tuan et al. | 346/159 X |
| 4,717,999 | 1/1988 | Kaneko | 346/160 |
| 4,737,805 | 4/1988 | Weisfield et al. | 346/159 |
| 4,797,695 | 1/1989 | Konno et al. | 346/160 |
| 5,006,935 | 4/1991 | Takanashi et al. | 346/160 X |
| 5,060,040 | 10/1991 | Saika et al. | 257/53 |
| 5,225,706 | 7/1993 | Berger et al. | 257/53 X |
| 5,276,486 | 1/1994 | Ohno et al. | 355/220 |
| 5,327,339 | 7/1994 | Takeda et al. | 346/160 |

FOREIGN PATENT DOCUMENTS

| | | | |
|---|---|---|---|
| 60-90357 | 5/1985 | Japan | G03G 15/00 |

*Primary Examiner*—Peter S. Wong
*Assistant Examiner*—Randy W. Gibson
*Attorney, Agent, or Firm*—Limbach & Limbach

[57] ABSTRACT

The light-transmitting electrode is arranged in correspondence with a pixel, and the photoconductive element and the capacitor element which are arranged on one surface of the light-transmitting electrode and connected in series with each other through the light-transmitting electrode are arranged on a substrate. The plurality of photoelectric converters each of which can apply a voltage across the corresponding photoconductive and capacitor elements are two-dimentionally arranged, and the photoconductive elements and the capacitor elements are commonly connected to each other. A voltage is applied across the photoconductive elements and the capacitor elements.

10 Claims, 3 Drawing Sheets

ELECTROSTATIC LATENT IMAGE FORMING APPARATUS HAVING A PLURALITY OF PHOTOELECTRIC CONVERTERS

BACKGROUND OF THE INVENTION

1. Field of the Invention

The present invention relates to an image forming apparatus such as a page printer and an electrophotographic copying machine using a electrophotographic process.

2. Description of the Related Art

In a conventional electrophotographic process used in an image forming apparatus such as an electrophotographic copying machine and a page printer, a photosensitive body serving as a photoelectric converter for converting an optical image into an electrostatic image is used. After the photosensitive body is precharged (formation of charges) by a corona charger or the like the photosensitive body is exposed by the optical image to form the electrostatic latent image. The charges of the exposed portion are neutralized and disappear by the photoconductive effect of the photosensitive body. Charges are maintained in a non-exposed portion. In this manner, the optical image is converted into a charge image The charge image is developed by a toner to form a visible toner image, and this toner image is transferred and fixed on a recording medium. However, when the photosensitive body is precharged by the corona charger, ozone is produced.

Since the above electrophotographic process is featured by its high speed and high image quality, and will satisfy requests such as high image quality, high speed, and low running cost which are demanded to a hard copying machine, the electrophotographic process will be continuously used as a dominant recording scheme of the hard copying machine.

However, in recent years, as a large number of copying machines and page printers are popularly used in offices, these machines adversely affect the environments of the offices to pose a problem. More specifically, in consideration of the influence of ozone to human bodies, the production and leakage of ozone from the machines are being strictly regulated and legislated.

The environmental problem will continuously be a serious problem in the future, the regulation of ozone is increasingly strict, and a reduction of ozone is expected.

Strong demand has arisen for an image forming apparatus using an electrophotographic process serving as a recording process which does not use the corona charger.

In conventional exposure to form an electrostatic latent image, since the uniformly precharged surface of a photosensitive body is scanned with a beam to form the latent image, positional errors of optical beam scan appear as positional errors of the pixels of the formed image. For example, the rotational speed of a photosensitive drum must be very accurately adjusted so as to minimize the positional errors. This is a factor of increasing the cost of the image forming apparatus.

SUMMARY OF THE INVENTION

It is a primary object of the present invention to provide an image forming apparatus capable of using an electrophotographic process serving as a recording process which does not produce ozone.

It is another object of the present invention to provide an image forming apparatus in which pixels are always aligned and formed at accurate positions despite a relative positional difference between an exposing means, e.g., a beam scan, and a photosensitive body.

According to the present invention, there is provided an image forming apparatus comprising a latent image forming body, having an arrangement in which a plurality of photoelectric converters each of which is constituted by a light-transmitting electrode, a photoconductive element, and a capacitor element are two-dimensionally arranged, for forming an electrostatic image corresponding to an exposure image, the photoconductive element and the capacitor element being arranged on one surface of the light-transmitting electrode, connected in series with each other through the light-transmitting electrode, and arranged on a substrate, holding means for holding image data, exposing means for exposing the latent image forming body with an optical image corresponding to the image data held by the holding means, developing means for developing the latent image on the latent image forming body to form a developing agent image, transfer means for transferring the developing agent image on the photoelectric converters developed by the developing means to a medium on which an image is to be formed, and fixing means for fixing developing agent transferred to the medium on the medium.

According to the present invention, there is provided a photoelectric converter comprising a light-transmitting electrode, a photoconductive element, and a capacitor element, the photoconductive element and the capacitor element being arranged on one surface of the light-transmitting electrode, connected in series with each other through the light-transmitting electrode, and arranged on a substrate, wherein a voltage can be applied across the photoconductive element and the capacitor element.

According to the present invention, there is provided a method of manufacturing the photoelectric converter, comprising the steps of: depositing a chromium thin film on a glass substrate, photoetching the deposited chromium thin film to form first and second conductive layers, forming an amorphous silicon film on the first and second conductive layers by plasma chemical vapor deposition, patterning the amorphous silicon film by photoetching in the form of a strip crossing the first conductive layer to form a photoconductive layer, forming a silicon oxide film on the photoconductive layer by sputtering, removing the silicon oxide film from the photoconductive layer by photoetching, forming an indium tin oxide film on the photoetched silicon oxide film by sputtering, and patterning the indium tin oxide film by photoetching in the form of a rectangular portion including a first overlap portion between the photoconductive layer and the first conductive layer and a second overlap portion between the photoconductive layer and the second conductive layer, thereby forming a light-transmitting electrode.

According to the present invention, there is provided a latent image forming body wherein a plurality of photoelectric converters each of which is constituted by a light-transmitting electrode arranged in correspondence with a pixel, a photoconductive element, and a capacitor element, the photoconductive element and the capacitor element being arranged on one surface of the light-transmitting electrode, connected in series with each other through the light-transmitting electrode, and arranged on a substrate, and which can apply a voltage across the corresponding photoconductive and capacitor elements are two-dimensionally arranged, the photoconductive elements and the capacitor elements are commonly connected to each other, and a voltage can be applied across the photoconductive elements and the capacitor elements.

According to the present invention, in the above arrangement, the image forming apparatus comprises the latent image forming body, having the arrangement in which the plurality of photoelectric converters each of which is constituted by the light-transmitting electrode, the photoconductive element, and the capacitor element are two-dimensionally arranged, for forming a latent image corresponding to an exposure image, the photoconductive element and the capacitor element being arranged on one surface of the light-transmitting electrode, connected in series with each other through the light-transmitting electrode, and arranged on a substrate. Image data is held by the holding means, and the latent image forming body is exposed with an optical image corresponding to the image data supplied from the holding means. The latent image on the latent image forming body is developed, and the developing agent image is transferred to a medium on which an image is to be formed. The developing agent transferred to the medium is fixed on the medium.

According to the present invention, in the above arrangement, the light-transmitting electrode, and the photoconductive element and the capacitor element which are arranged on one surface of the light-transmitting electrode and connected in series with each other through the light-transmitting electrode are arranged on a substrate. A voltage can be applied across the photoconductive element and the capacitor element.

According to the present invention, in the above arrangement, a light-transmitting electrode is formed by depositing a chromium thin film on a glass substrate, photoetching the deposited chromium thin film to form first and second conductive layers, forming an amorphous silicon film on the first and second conductive layers by plasma chemical vapor deposition, patterning the amorphous silicon film by photoetching in the form of a belt crossing the first conductive layer to form a photoconductive layer, forming a silicon oxide film on the photoconductive layer by sputtering, removing the silicon oxide film from the photoconductive layer by photoetching, forming an indium tin oxide film on the photoetched silicon oxide film by sputtering, and patterning the indium tin oxide film by photoetching in the form of a rectangular portion including the first overlap portion between the photoconductive layer and the first conductive layer and the second overlap portion between the photoconductive layer and the second conductive layer.

According to the present invention, in the above arrangement, the light-transmitting electrode arranged in correspondence with a pixel, and the photoconductive element and the capacitor element which are arranged on one surface of the light-transmitting electrode and connected in series with each other through the light-transmitting electrode are arranged on a substrate. The plurality of photoelectric converters each of which can apply a voltage across the corresponding photoconductive and capacitor elements are two-dimensionally arranged, and the photoconductive elements and the capacitor elements are commonly connected to each other. A voltage is applied across the photoconductive elements and the capacitor elements.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the present invention will be described below with reference to the accompanying drawings.

Figure 1:
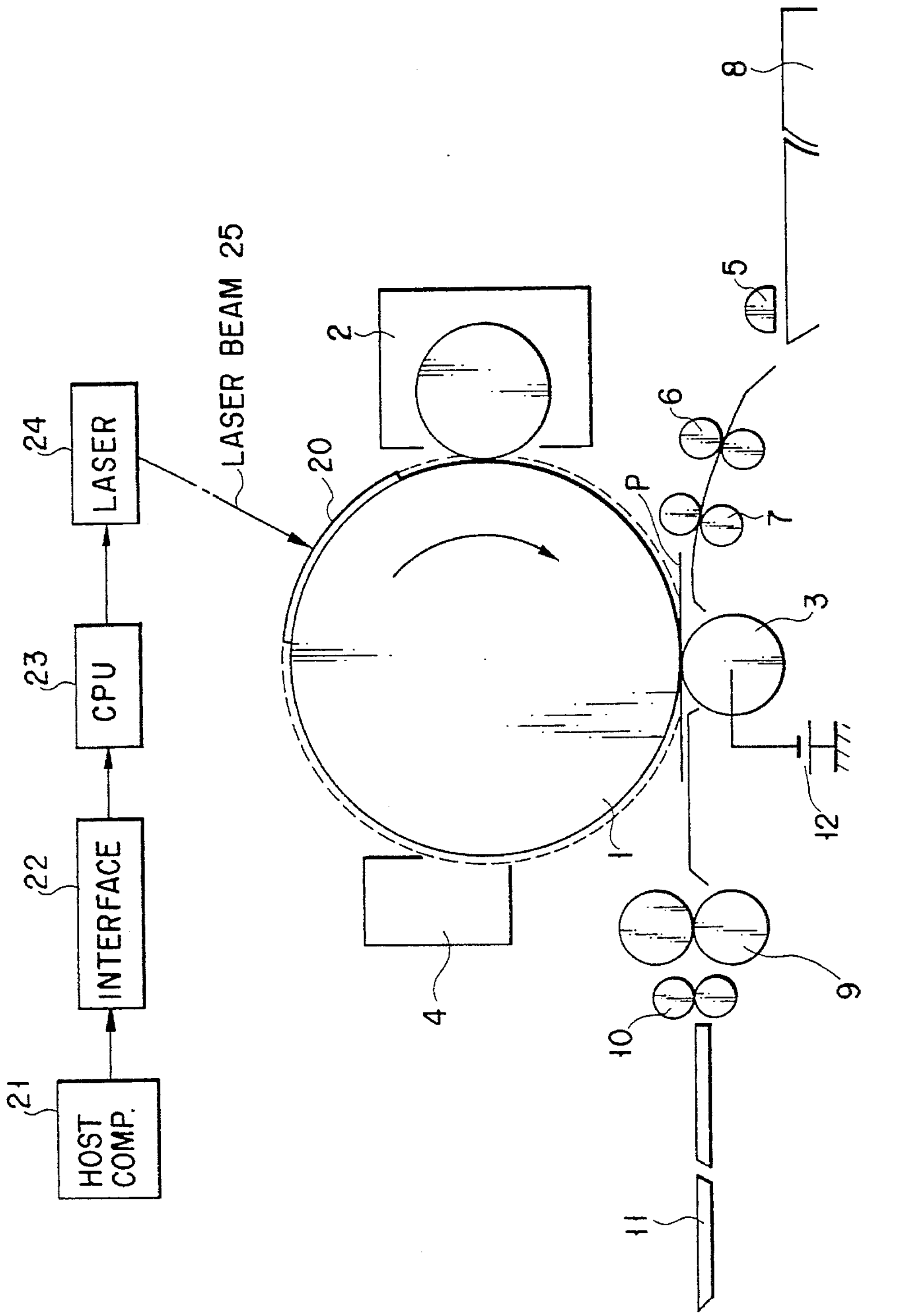
FIG. 1 is a sectional view showing a schematic arrangement of a copying machine according to an embodiment of the present invention.

FIG. 1 schematically shows, for example, the internal arrangement of a laser printer as an image forming apparatus according to the present invention. The laser printer comprises an image data supply unit and an image forming unit using an electrophotographic scheme capable of forming an image on a medium on which an image is to be formed. When a laser beam 25 radiated from a laser 24 and modulated in response to image data supplied from a host computer 21 through an interface 22 and a CPU 23 scans and exposes a latent image forming body 1 serving as an image carrier, a latent image corresponding to the image data is formed on the latent image forming body 1. A developing unit 2 for developing the latent image on the latent image forming body 1 into a toner image serving as a visible image using a toner, a transfer roller 3 for transferring the toner image on the latent image forming body 1 to a paper sheet P, and a cleaner 4 for cleaning the surface of the latent image forming body 1 are arranged around the latent image forming body 1.

A toner formed of a resin containing a dye, and a magnetic material (carrier) are mixed in the developing unit 2. The toner is agitated in the developing unit 2 to be triboelectrified and has charges of an opposite polarity as that of charges on the latent image forming body 1. When the surface of the latent image forming body 1 passes through the developing unit 2, the toner is electrostatically attracted to an exposed latent image portion, thereby developing the latent image by the toner.

The latent image forming body 1 on which the toner image is formed is continuously rotated. When the latent image portion of the latent image forming body 1 reaches a transfer position, the toner image is transferred to the paper sheet P serving as a medium on which an image is to be formed and which is fed by a feeding system at a proper timing.

The transfer roller 3 is constituted by a roller having an elastic resistance, and a DC power supply 12 applies a predetermined voltage to the transfer roller 3 such that the toner image on the latent image forming body 1 tends to be attracted by an electric field generated by the DC power supply 12.

The feeding system comprises pickup rollers 5, feed rollers 6, and register rollers 7. One of the paper sheets P picked from a paper cassette 8 by the pickup rollers 5 is conveyed to the register rollers 7 by the feed rollers 6. After the rollers 7 correct the ramp of the paper sheet P, the paper sheet P is fed to the transfer position.

The toner image which is in contact with the paper sheet P at the transfer position is separated from the latent image forming body 1 by the transfer roller 3 and transferred to the paper sheet P. In this manner, the toner image on the basis of image data is formed on the paper sheet P.

Since the paper sheet P to which the toner image has been transferred is brought into tight contact with the surface of the latent image forming body 1 by static electricity, the paper sheet P is separated from the surface of the latent image forming body 1 by a separating means (not shown) and fed to a fixing unit 9. The fixing unit 9 is constituted by a press roller and a heat roller in which a heater is incorporated. The fixing unit 9 heats the toner image which is only attracted to the paper sheet P by a charge force to melt the toner, thereby permanently fixing the toner image on the paper sheet P. The paper sheet P on which the toner image has been fixed is conveyed to a delivery tray 11 by delivery rollers 10.

On the other hand, the latent image forming body 1 which has passed through the transfer position is continuously rotated, and the latent image forming body 1 is cleaned by the cleaner 4 by removing a residual toner and paper dust. Thereafter, the series of processes which are started from a scanning/exposing process performed by an original scanning unit are started again as needed.

Figure 2:
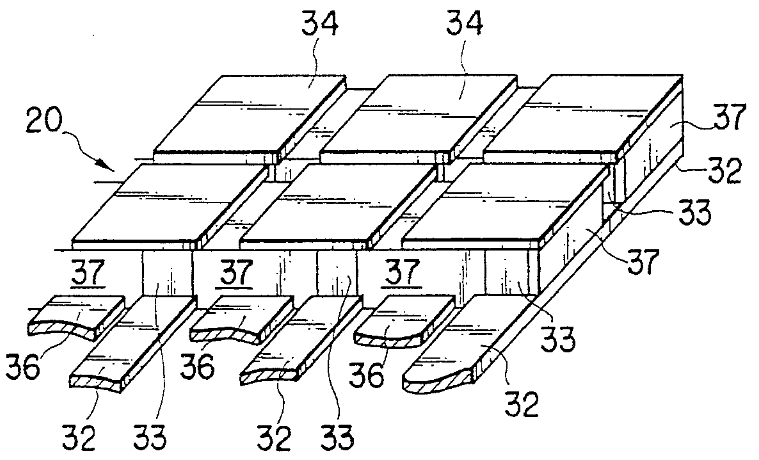
FIG. 2 is a perspective view showing a latent image forming body in FIG. 1.
Figure 3:
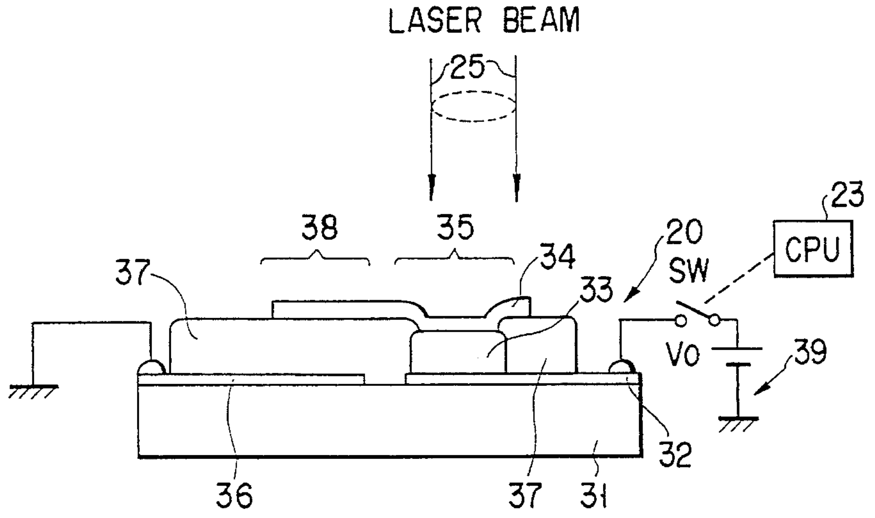
FIG. 3 is a sectional view showing a photoelectric converter in FIG. 2.

Photoelectric converters 20 used in the latent image forming body 1 will be described below using FIGS. 2 and 3. FIG. 2 typically shows a part of the latent image forming body 1, and FIG. 3 typically shows the section of each of the photoelectric converters 20.

That is, in the latent image forming body 1, the photoelectric converters 20 are two-dimensionally arranged in one-to-one correspondence with predetermined pixels.

In each of the photoelectric converters 20, a conductive layer 32, a photoconductive layer 33, and a light-transmitting electrode 34 are stacked on an insulating substrate 31 to form a photoconductive element 35. A conductive layer 36, an insulating layer 37, and the light-transmitting electrode 34 are stacked to form a capacitor element 38. The photoconductive element 35 and the capacitor element 38 are connected in series with each other through the light-transmitting electrode 34. The conductive layer 32 of the photoconductive element 35 is connected to the positive side of a DC power supply 39, and the conductive layer 36 serving as one conductive layer of the capacitor element 38 is grounded.

In the latent image forming body 1, the photoconductive layers 33 are independently formed in correspondence with pixels. The independent photoconductive layers 33 which are formed in the same column are commonly connected to each other by each of the conductive layers 32. In addition, the conductive layers 36 are arranged in parallel with the conductive layers 32. Each of the capacitor elements 38 is formed at a portion where each of the conductive layers 36 is opposite to the corresponding independent light-transmitting electrode 34.

Therefore, the capacitor elements 38 which are arranged in the same column are commonly connected to each other in the same manner as that of the arrangement of the photoconductive elements 35. The conductive layers 32 and the conductive layers 36 are commonly connected to each other, the conductive layers 32 are connected to the positive side of the DC power supply 39, and the conductive layers 36 are grounded.

In the latent image forming body 1, since potentials are generated by the light-transmitting electrodes 34 which are arranged in correspondence with the pixels, these potentials are uniformly distributed within the entire area of the pixels. In addition, since the positional relationship between the pixels is fixed, even when the position of the laser beam 25 is shifted within a range between the photoconductive layers 33, pixel formation free from pitch variations can be performed in both main scanning and subscanning directions.

When the latent image forming body 1 is applied to the conventional electrophotographic process, and the latent image forming body 1 is used in place of a conventional photosensitive body, a corona-chargeless electrophotographic process can be obtained.

The above photoelectric converters 20 will be manufactured as follows.

That is, a chromium thin film is deposited on the washed glass substrate (Corning 705 may be used) 31 having a cylindrical shape, and the conductive layers 32 and 36 are patterned by a normal photoetching process (PEP). An amorphous silicon film is formed on the conductive layers 32 and 36 by plasma CVD (Chemical Vapor Deposition), and the amorphous silicon on each of the conductive layers 32 is patterned by photoetching to form island-shaped photoconductive layers 33.

The $SiO_2$ (silicon oxide) 37 is formed on the entire surface of the resultant structure by sputtering, and the $SiO_2$ (silicon oxide) film 37 on each of the photoconductive layers 33 is removed. An ITO (Indium Tin Oxide) film is formed on the entire surface of the resultant structure by sputtering, and the ITO film is patterned by photoetching in the form of independent rectangular portions each of which includes a first overlap portion of the photoconductive layer 33 and the conductive layer 32 and a second overlap portion of the insulating layer 37 and the conductive layer 36 having a predetermined size, thereby forming the plurality of island-shaped light-transmitting electrodes 34.

Figure 4:
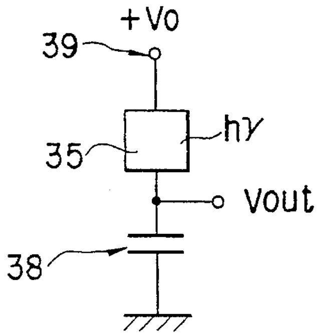
FIG. 4 is a view showing an equivalent circuit of the photoelectric converter in FIG. 3.

The operation of each of the photoelectric converters 20 will be described below. FIG. 4 shows the equivalent circuit of each of the photoelectric converters 20 shown in FIG. 3. The photoconductive element 35 and the capacitor element 38 are connected in series with each other by the light-transmitting electrode 34, and a voltage vo is applied from the DC power supply 39 across both the ends of the series circuit of the photoconductive element 35 and the capacitor element 38. When a laser beam having an energy of hv is incident on the element 35, a potential VOUT appears between the photoconductive element 35 and the capacitor element 38. This potential is a potential which appears from the light-transmitting electrode 34, and the potential is equal to that of a latent image obtained by converting an optical image.

In an initial state, a switch SW is set in an OFF state by the CPU 23, the capacitor element 38 is not charged, and the potential $V_{OUT}$ is 0V. In a dark state, the switch SW is turned on by the CPU 23 to supply the voltage Vo from the DC power supply 39 to the series circuit of the photoconductive element 35 and the capacitor element 38. Since the dark state is set, the photoconductive element 35 also serves as a capacitor, and the applied voltage vo is distributed to the photoconductive element 35 and the capacitor element 38 according to the capacitance ratio thereof. At this time, the potential $V_{OUT}$ is set to be $V_1$ as shown in FIG. 5.

Figure 5:
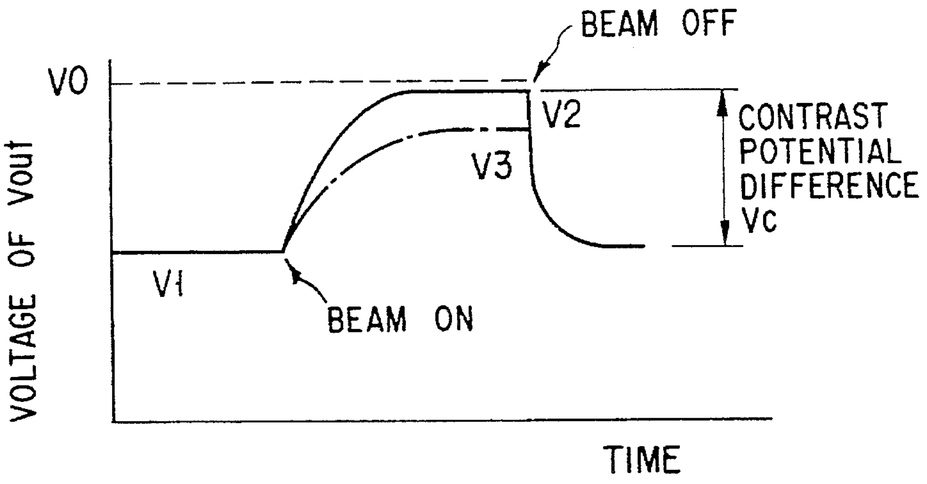
FIG. 5 is a view for explaining an operation state of the photoelectric converter in FIG. 2.

When the beam 25 is incident on the photoconductive element 35 through the light-transmitting electrode 34, the photoconductive layer 33 is rendered conductive, and as shown in FIG. 5, a voltage output to the potential VOUT is increased from the voltage $V_1$ obtained before the beam 25 is incident on the photoconductive element 35 to a voltage $V_2$ close to the applied voltage vo from the DC power supply 39. The time constant of the increase in voltage is principally determined by the time constant of the photoconductive layer 33 and the capacitor element 38. When no beam is incident on the photoconductive element 35, a voltage ($V_{OUT}$) which appears from the light-transmitting electrode 34 is the voltage $V_1$.

Therefore, a contrast potential difference $Vc=V_2-V_1$ can be obtained in accordance with the presence/absence of the incident beam 25. After the incidence of the beam 25 is finished, since the voltage Vo is applied, the potential $V_{OUT}$ is returned to the voltage $V_1$. In this manner, the photoelectric converter 20 can convert an optical image into a latent image.

The contrast potential can be controlled by controlling the energy of the beam which is incident on the photoconductive element 35. It is well-known that the conductive degree of the photoconductive element 35 depends on the energy of the incident beam. In the above description, the photoconductive element 35 is rendered almost fully conductive, and the voltage Vo applied from the DC power supply 39 is applied to the capacitor element 38 while the voltage vo rarely drops.

When the energy of the incident beam which is incident on the photoconductive element 35 is controlled to restrict the conductive state of the photoconductive element 35, a voltage applied to the capacitor element 38 is the difference between the power supply voltage Vo and the voltage distributed to the photoconductive element 35, and a voltage $V_3$ lower than the above-described voltage appears as the potential $V_{OUT}$. In this manner, in each of the photoelectric converters 20, the potential of the electrostatic image can be changed according to the energy of the incident beam.

Voltage supply to the rotating body 1 from the lower supply 39 and the ground may be performed by, for example, a well-known slip ring and a brush electrode (not shown).

Figure 6:
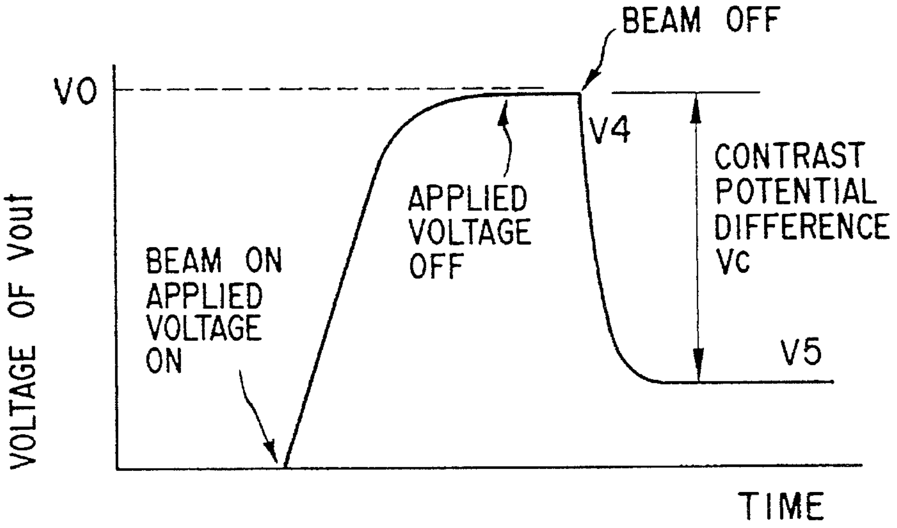
FIG. 6 is a view for explaining an operation state of the photoelectric converter in FIG. 2.

A case wherein the voltage is applied from the DC power supply 39 to the photoelectric converter 20 during all the processes has been described above. However, the voltage may be applied from the DC power supply 39 to each of the photoelectric converters 20 under the control of the CPU 23 only while the beam is incident on the photoelectric converter 20. In this case, a contrast potential is as follows.

when the switch SW is turned on in synchronism with the incidence of the beam 25 to apply a voltage to each of the photoelectric converters 20, the capacitor element 38 is charged by the voltage Vo through the photoconductive element 35, and as shown in FIG. 6, a voltage $V_4$ appears as the output of the potential $V_{OUT}$. When the voltage application is stopped by turning off the switch SW immediately before the incidence of the beam is finished, the photoconductive element 35 is returned to be an insulator. However, since no voltage is applied from the DC power supply 39, charges accumulated in the capacitor element 38 are distributed to the capacitor element 38 and the photoconductive element 35 to cause a voltage $V_5$ to appear as the output of the potential $V_{OUT}$.

Therefore, a contrast potential difference $Vc=V_5-V_4$ is obtained in accordance with the presence/absence of the incidence of the beam 25. This contrast potential difference is larger than that of the above description.

As described above, when a latent image forming body for converting an optical image into a latent image without using charges formed by a corona charger is used, an ozone-less electrophotographic process can be obtained.

For this reason, an optical image can be converted into a latent image without performing precharge which produces ozone, an ozone-less electrophotographic process can be obtained, and the electrophotographic process which can perform gradation recording can be obtained.

As has been described above, according to the present invention, even when there is a small positional difference of an exposure beam scanned on a photosensitive body, the aligned pixels can be obtained. An image forming apparatus which can use an electrophotographic process serving as a recording process using no ozone-generating corona charger can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A latent image forming body for forming a latent image corresponding to an image, comprising:

- a plurality of photoelectric converters including a plurality of electrodes for obtaining a potential by performing photoelectric conversion of a light beam, each of the plurality of photoelectric converters including:
  - a first electroconductive supporting member applied with a voltage from an electric power source;
  - a photoconductive layer mounted on said first supporting member and having an electroconductive state changed in accordance with an incident light beam;
  - a second electroconductive supporting member connected to ground;
  - an insulation layer mounted on said second supporting member, said insulation layer being applied with the voltage from said electric source in accordance with the electroconductive state of said photoconductive layer; and
  - at least one of the plurality of electrodes mounted on said photoconductive layer and said insulation layer to transmit the incident light to said photoconductive layer for holding an electric potential obtained between said photoconductive layer and said insulation layer; and
- a supporting body for supporting said plurality of photoelectric converters, said plurality of photoelectric converters being arranged such that said plurality of electrodes are closely arranged two-dimensionally with respect to each other for forming an electrostatic latent image in the plurality of electrodes of said plurality of photoelectric converters.

2. An image forming apparatus according to claim 1, wherein each of the light-transmitting electrodes has a surface area larger than a laser beam exposing area.

3. A latent image forming body according to claim 1, wherein said plurality of electrodes are light-transmitting electrodes.

4. An image forming apparatus comprising:

an electrostatic latent image forming body including:

a plurality of photoelectric converters including a plurality of electrodes for obtaining latent image potentials by performing photoelectric conversion of a light beam, each of the plurality of photoelectric converters including:

a first electroconductive supporting member applied with a voltage from an electric power source;

a photoconductive layer mounted on said first supporting member and having an electroconductive state changed in accordance with an incident light beam;

a second electroconductive supporting member connected to ground;

an insulation layer mounted on said second supporting member, said insulation layer being applied with the voltage from said electric source in accordance with the electroconductive state of said photoconductive layer; and at least one of the plurality of electrodes mounted on said photoconductive layer and said insulation layer to transmit the incident light to said photoconductive layer for holding an electric potential obtained between said photoconductive layer and said insulation layer; and a supporting body on which said plurality of photoelectric converters are arranged with the plurality of electrodes of said plurality of photoelectric converters arranged two-dimensionally and close to each other;

means for exposing said plurality of photoelectric converters with the light beam corresponding to the image to form the electrostatic latent image on the plurality of electrodes of said electrostatic latent image forming body; and means for developing the electrostatic latent image formed on said electrostatic latent image forming body by said exposing means.

5. An image forming apparatus according to claim 4, further comprising a DC power supply for supplying a DC voltage to the photoconductive element and the capacitor element connected in series with each other.

6. An image forming apparatus according to claim 5, further comprising a switch connected between the DC power source and the photoconductive element and voltage applying means for closing said switch for a predetermined period of time to apply the DC voltage to the serially connected photoconductive element and the capacitor element so as to charge the photoconductive element and the capacitor element prior to exposure by said exposing means.

7. An image forming apparatus according to claim 4, wherein said exposing means includes means for supplying a laser beam modulated by image information on to the light-transmitting electrode provided on the electrostatic latent image forming body; and said arrangement has a plurality of light-transmitting electrodes arranged in main-scanning and sub-scanning directions of the laser beam, each of the light-transmitting electrodes having a surface area larger than a laser beam exposing area.

8. An image forming apparatus according to claim 1, wherein said plurality of electrodes are light-transmitting electrodes.

9. A process for forming an image on an electrostatic latent image forming body including a plurality of photoelectric converters having a plurality of electrodes for obtaining latent image potentials by performing photoelectric conversion of a light beam, each of the plurality of photoelectric converters including;

a first electroconductive supporting member;

an electric source for applying a voltage to said first supporting member;

a photoconductive layer mounted on said first supporting member and having an electroconductive state changed in accordance with an incident light beam;

a second electroconductive supporting member connected to ground;

an insulation layer mounted on said second support member, said insulation layer being applied with the voltage from said electric source in accordance with the electroconductive state of said photoconductive layer; and at least one of the plurality of the electrodes mounted on said photoconductive layer and said insulation layer to transmit the incident light to said photoconductive layer for holding an electric potential obtained between said photoconductive layer and said insulation layer; and a supporting body on which said plurality of photoelectric converters are arranged with the plurality of electrodes of said plurality of photoelectric converters arranged two-dimensionally and close to each other;

wherein said process comprises the steps of:

exposing said plurality of photoelectric converters with the light beam corresponding to the image to form the electrostatic latent image on the plurality of electrodes of said electrostatic latent image forming body; and developing the electrostatic latent image formed on said electrostatic latent image forming body.

10. A process according to claim 9, wherein said plurality of electrodes are light-transmitting electrodes.

* * * * *